(12) United States Patent
Bland et al.

(10) Patent No.: US 11,787,214 B2
(45) Date of Patent: Oct. 17, 2023

(54) FACE FILMS AND PRESSURE SENSITIVE LAMINATES FOR PRINTING

(71) Applicant: Avery Dennison Corporation, Glendale, CA (US)

(72) Inventors: David Bland, Concord, OH (US); Wen-Li Chen, Rochester, NY (US); Michael Ramsay, Newbury, OH (US); Shanshan Wang, Mentor, OH (US)

(73) Assignee: Avery Dennison Corporation, Glendale, CA (US)

( * ) Notice: Subject to any disclaimer, the term of this patent is extended or adjusted under 35 U.S.C. 154(b) by 1297 days.

(21) Appl. No.: 16/235,368

(22) Filed: Dec. 28, 2018

(65) Prior Publication Data
US 2019/0135012 A1 May 9, 2019

Related U.S. Application Data

(62) Division of application No. 15/435,256, filed on Feb. 16, 2017, now Pat. No. 10,232,657.

(Continued)

(51) Int. Cl.
*B41M 5/52* (2006.01)
*B29C 48/08* (2019.01)
(Continued)

(52) U.S. Cl.
CPC ........... *B41M 5/52* (2013.01); *B29C 48/0018* (2019.02); *B29C 48/08* (2019.02); *B29C 48/21* (2019.02); *B41M 5/508* (2013.01); *B29C 48/022* (2019.02); *B29K 2023/00* (2013.01); *B29K 2023/065* (2013.01); *B29K 2023/0625* (2013.01); *B29K 2105/041* (2013.01); *B29K 2509/02* (2013.01);
(Continued)

(58) Field of Classification Search
CPC .. B41M 5/508; B41M 5/0064; B41M 5/0047; B41M 5/52; B41M 5/5281; B41M 5/5218; B41M 5/5254; B41M 2205/36; B41M 5/5272; B29C 48/21; B29C 48/0018; B29C 48/08; B29C 48/022; B29K 2023/00; B29K 2509/02; B29K 2023/065; B29K 2105/041; B29K 2023/0625; Y10T 428/24802; B29L 2031/767
See application file for complete search history.

(56) References Cited

U.S. PATENT DOCUMENTS

| 3,239,478 A | 3/1966 | Harlan, Jr. |
| 5,585,193 A | 12/1996 | Josephy et al. |

(Continued)

FOREIGN PATENT DOCUMENTS

| CN | 100411857 | 8/2008 |
| EP | 1757653 | 1/2011 |

(Continued)

OTHER PUBLICATIONS

International Search Report and Written Opinion dated May 8, 2017 issued in corresponding IA No. PCT/US2017/018242 filed Feb. 16, 2017.

(Continued)

*Primary Examiner* — Monica A Huson

(57) ABSTRACT

Microporous structures in face films are described for improving printability of the films. Also described are laminates and pressure sensitive adhesive laminates including the microporous structured face films. Various related methods are additionally described.

21 Claims, 2 Drawing Sheets

Related U.S. Application Data

(60) Provisional application No. 62/304,991, filed on Mar. 8, 2016.

(51) Int. Cl.
　　*B29C 48/00*　　　(2019.01)
　　*B29C 48/21*　　　(2019.01)
　　*B41M 5/50*　　　(2006.01)
　　*B29K 23/00*　　　(2006.01)
　　*B29K 105/04*　　(2006.01)
　　*B29K 509/02*　　(2006.01)
　　*B29L 31/00*　　　(2006.01)

(52) U.S. Cl.
　　CPC ...... *B29L 2031/767* (2013.01); *B41M 5/5218* (2013.01); *B41M 5/5254* (2013.01); *B41M 5/5272* (2013.01); *B41M 5/5281* (2013.01); *B41M 2205/36* (2013.01); *Y10T 428/24802* (2015.01)

(56) References Cited

U.S. PATENT DOCUMENTS

| | | |
|---|---|---|
| 5,709,937 A | 1/1998 | Adams et al. |
| 5,728,469 A | 3/1998 | Mann et al. |
| 6,114,022 A | 9/2000 | Warner et al. |
| 6,376,058 B1 | 4/2002 | Schut et al. |
| 6,486,267 B1 | 11/2002 | Bilodeau |
| 6,632,510 B1 | 10/2003 | Waller, Jr. et al. |
| 6,663,947 B2 | 12/2003 | Freedman et al. |
| 6,790,491 B2 | 9/2004 | Sebastian et al. |
| 6,821,592 B2 | 11/2004 | Rodick |
| 6,835,462 B2 | 12/2004 | Sun et al. |
| 6,979,480 B1 | 12/2005 | Schulz et al. |
| 7,217,463 B2 | 5/2007 | Henderson |
| 7,270,723 B2 | 9/2007 | McCormack et al. |
| 7,410,706 B2 | 8/2008 | Rodick |
| 7,932,196 B2 | 4/2011 | McCormack et al. |
| 8,491,991 B2 | 7/2013 | Masuda et al. |
| 2002/0028320 A1 | 3/2002 | Iwasa et al. |
| 2003/0017321 A1 | 1/2003 | Iwasa et al. |
| 2003/0235681 A1 | 12/2003 | Sebastian et al. |
| 2004/0265516 A1 | 12/2004 | Schulz et al. |
| 2005/0074549 A1 | 4/2005 | Su et al. |
| 2005/0017015 A1 | 8/2005 | Miller et al. |
| 2007/0054070 A1 | 3/2007 | Laney et al. |
| 2009/0035478 A1 | 2/2009 | Zhou et al. |
| 2011/0063360 A1 | 3/2011 | Song et al. |

FOREIGN PATENT DOCUMENTS

| | | |
|---|---|---|
| JP | 2006-095940 | 4/2006 |
| JP | 2007-186842 | 7/2007 |
| JP | 2012-107252 | 6/2012 |
| WO | 9309195 | 5/1993 |

OTHER PUBLICATIONS

International Preliminary Report on Patentability dated Feb. 13, 2018 issued in corresponding IA No. PCT/US2017/018242 filed Feb. 16, 2017.

FACE FILMS AND PRESSURE SENSITIVE LAMINATES FOR PRINTING

CROSS REFERENCE TO RELATED APPLICATIONS

This application is a divisional application and claims priority from U.S. nonprovisional application Ser. No. 15/435,256 filed Feb. 16, 2017 which claims priority from U.S. provisional application Ser. No. 62/304,991 filed on Mar. 8, 2016.

FIELD

The present subject matter relates to a low cost print media for use with a wide array of inks and printing technologies, and particularly solvent and water based inkjet printing which requires the print media to rapidly absorb ink liquid to provide dry print and good image quality.

BACKGROUND

Digital inkjet printing is widely used in imaging graphics, banners, labels, etc. This printing technology attracts a wide range of applications due to its short turnaround time, and flexible modification of the image used for each impression.

Based on the properties of the printing ink, a majority of inkjet printing technologies can be classified as solvent based inkjet, water based inkjet, UV inkjet, and latex inkjet. For UV inkjet printing, a UV inkjet printer must be used which emits a UV beam to solidify the printed ink. Latex inkjet printers are equipped with one or more high capacity heater(s) to evaporate water in the printed ink in a relatively short time. Solvent inkjet printers, especially those using high boiling point solvent in the ink, and water inkjet printers typically do not have enough heating capacity to remove the residual liquid in the printed ink. Instead, those printers require print media able to absorb most of the liquid ejected from the print head in a relatively short time to control the formation of ink dots on the media and attain a "dry to touch" characteristic after printing. For example, Eco-Sol Max ink used in Roland Eco-Sol inkjet printers contains over 90% of a mixture of diethylene glycol diethyl ether (boiling point=189° C.), r-butyrolactone (boiling point=204° C.), and tetraethylene glycol dimethyl ether (boiling point=275° C.). The printer heating bed is typically heated up to 50° C. Dye or pigment water based inkjet ink used in desktop or narrow web printers typically contains 90% water and the printers equipped with these inks generally have no media heating capability.

Most ink receptive layers used in currently available print media designed for solvent inkjet printers use solvent swellable polymers and absorptive filler to "lock in" the liquid in the media during print. The selection of the polymers is based on solubility parameters between polymer and solvent. The solubility parameter between polymer and solvent should be such that the polymer can swell with solvent. Typical polymers used in conventional ink receptive layers include vinyl, acrylics, polyacrylate, polyurethane, amorphous polyester, polyether, polyvinyl alcohol, etc. In order to provide enough absorption capacity, the ink receptive layer has to be thick enough, typically at least 25 microns, to absorb the volume of liquid ink deposited on the print media. This makes the resulting media material relatively costly.

Polyolefins are much less expensive than the swellable polymeric materials previously noted. The average cost of polyethylene and polypropylene is approximately 25% of the cost of polymers such as polyurethane, polyvinyl alcohol, amorphous polyester, etc. However, solid polyolefin films such as polyethylene and polypropylene have no affinity to most polar solvents used in solvent inkjet printing and water used in water inkjet printing in the market. As result, films with a layer or coating of polyolefin(s) as an ink receptive surface do not sufficiently absorb the ink liquid and thus the media is relatively wet after print and exhibits poor printing image quality, namely low image resolution and ink bleeding. As will be appreciated, this is undesirable.

Accordingly, a need remains for strategies by which polyolefin films and other materials which do not have a sufficient affinity for polar solvents used in solvent inkjet printing and/or water used in water inkjet printing, can be used as print media. A need also exists for a new class of print media which addresses the above noted problems.

SUMMARY

The difficulties and drawbacks associated with previous approaches are addressed in the present subject matter as follows.

In one aspect, the present subject matter provides a polymeric film adapted for absorbing liquid inks from inkjet printing. The film defines a first face for receiving print, and a second oppositely directed face. The film includes a microporous structure extending along at least the first face. The microporous structure has a porosity within a range from 40% to 75%. The microporous structure includes a plurality of interconnected pores having a pore size distribution within a range of from 2 microns to 10 nm. The microporous structure has a thickness of at least 20 microns as measured from the first face. The film exhibits an ink absorption rate of at least 0.01 picoliter/$\mu m^2$/second at a printing temperature of 40° C.

In another aspect, the present subject matter provides a laminate comprising a polymeric film adapted for absorbing liquid inks from inkjet printing. The film defines a first face for receiving print, and a second oppositely directed face. The film includes a microporous structure extending along at least the first face. The microporous structure has a porosity within a range from 40% to 75%. The microporous structure includes a plurality of interconnected pores having a pore size distribution within a range of from 2 microns to 10 nm. The microporous structure has a thickness of at least 20 microns as measured from the first face. The film exhibits an ink absorption rate of at least 0.01 picoliter/$\mu m^2$/second at a printing temperature of 40° C. The laminate also comprises at least one core layer disposed along the second face of the film.

In yet another aspect, the present subject matter provides an adhesive laminate comprising a polymeric film adapted for absorbing liquid inks from inkjet printing. The film defines a first face for receiving print, and a second oppositely directed face. The film includes a microporous structure extending along at least the first face. The microporous structure has a porosity within a range from 40% to 75%. The microporous structure includes a plurality of interconnected pores having a pore size distribution within a range of from 2 microns to 10 nm. The microporous structure has a thickness of at least 20 microns as measured from the first face. The film exhibits an ink absorption rate of at least 0.01 picoliter/$\mu m^2$/second at a printing temperature of 40° C. The adhesive laminate also comprises a layer of adhesive disposed along the second face of the film.

In still another aspect, the present subject matter provides a method of forming a polymeric film adapted for absorbing liquid inks from inkjet printing. The film includes a microporous structure extending along at least one face of the film. The method comprises extruding polymer to form a film. The method also comprises stretching the film to a stretch ratio within a range of from 1:1.1 to 1:10 such that the microporous structure has a porosity within a range from 40% to 75% and includes a plurality of interconnected pores having a pore size distribution within a range of from 2 microns to 10 nm.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Generally, the present subject matter provides films with particular microporous structures that provide a print receptive face useful for digital inkjet printing and especially solvent inkjet printing and/or water inkjet printing. In many embodiments, the films are adapted for absorbing liquid inks in inkjet printing which requires the film to absorb the liquid component in the ink to thereby dry the ink and provide good print quality. The microporous structures can be formed or otherwise incorporated in a wide range of films and other substrates to provide a print receptive face. The microporous structures are particularly useful for incorporation in polyolefin films such as polyethylene films and polypropylene films to provide a printable media with low cost.

In many embodiments, the present subject matter provides low cost pressure sensitive (PSA) laminates with an open cell microporous structured liquid absorptive layer constituting a print receptive face that exhibits good ink fluid management characteristics, good print image quality and fast drying speeds to enable the laminates to be used in digital inkjet printing, and especially absorption based inkjet printing technology using high boiling point solvent inkjet printing and water based inkjet printing. For these types of printers, usually the printers do not have enough heating capability to evaporate the ink liquid after printing. Instead, these printers primarily rely on a print receptive face of the print media to absorb the ink liquid into the underlying media in a relatively short time. The laminates are also printable with other non-absorption based inkjet printing such as latex inkjet printing and UV inkjet printing. The laminates are also printable with other non-inkjet printing technologies such as toner laser printing, flexographic printing, gravure printing, screen printing, etc.

Figure 1:
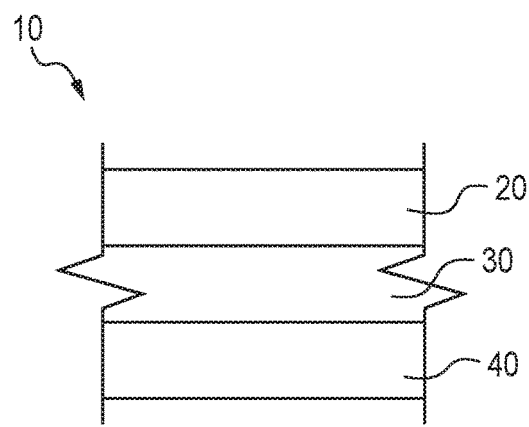
FIG. 1 is a schematic cross section of an embodiment of a pressure sensitive adhesive laminate in accordance with the present subject matter.

Referring to FIG. 1, in many embodiments, the PSA laminates 10 comprise a top film 20, a layer 30 of pressure sensitive adhesive disposed in a middle or interior region, and a release liner 40 removably covering the adhesive layer 30 on the back. The film on the top is referred to herein as a "face film" and this film can be in the form of a single layer extruded film, a multilayer extruded film, a coated film, and/or a laminated film.

Figure 2:
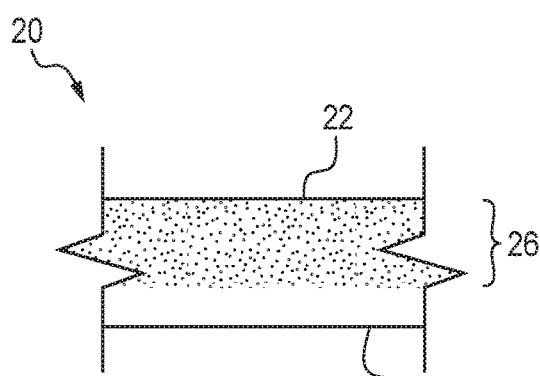
FIG. 2 is a schematic cross section of an embodiment of a face film having an absorption layer or region(s) in accordance with the present subject matter.

Referring to FIG. 2, the face film 20 defines a print receptive face 22, an opposite face 24, and includes an absorption layer 26 or region(s) resulting from a microporous structure. The absorption layer extends immediately alongside the print receptive face 22 of the face film 20 and the laminate 10. For a single layer face film such as shown in FIG. 2, the face film 20 comprises an open cell microporous structure within region 26 that has open cell interconnected pores forming continuous channels for ink fluid absorption.

Figure 3:
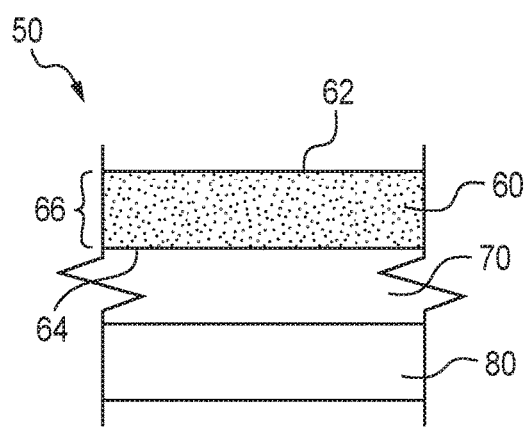
FIG. 3 is a schematic cross section of an embodiment of a multilayer face film having an absorption layer or region(s) in accordance with the present subject matter.

FIG. 3 illustrates a multilayer face film 50 comprising an outer layer 60 defining a print receptive face 62, an opposite face 64, and an absorption layer 66 or region(s) resulting from a microporous structure. The absorption layer 66 extends immediately alongside the print receptive face 62 of the face film 50. The print receptive face 62 of the face film 50 comprises an open cell microporous structure. The multilayer face film 50 also comprises one or more additional layers such as layers 70, 80 disposed along the face 64 of the outer layer 60. Each of the layers of the multilayer face film can differ in chemical composition or be the same or substantially the same. The multilayer face film 50 can be in the form of multiple extruded layers. For a laminated face film, the print receptive face comprises an open cell microporous structure and the layers under the print receptive face can be either a solid film layer or a porous film. The various layers are typically bonded together by adhesive, heat, or other chemicals. One or more tie layers can be used. In particular embodiments, the multilayer face film includes a plurality of layers in which a first layer extends along the print receptive face, and a second layer extends along an oppositely directed face of the film. One or more additional layers can be disposed between the first and second layers. The microporous structure can extend (i) partially through the first layer, (ii) entirely through the first layer, (iii) entirely through the first layer and partially through the second layer, or (iv) entirely through both the first and second layers.

A majority of liquid absorption properties of the top layer or region(s) along the print side result from a liquid capillary flow effect of the open cell microporous structure. The thickness of the microporous structure layer on the print receptive face is at least 20 microns to provide sufficient liquid absorption capability. Referring to FIG. 2 for example, this means that the thickness of the absorption layer 26 of the face film 20 is at least 20 microns. The microporous structure of the absorption layer can extend the entire thickness of the face film, or as shown in FIG. 2, extend for only a portion of the thickness of the face film.

The porosity of the microporous structure layer or region is at least 40%, i.e., 40% by volume void content, to provide a relatively fast liquid absorption speed which thereby enables fast ink drying and accelerated printing speed. The porosity of the microporous structure layer or region is at least 40%, and may range from 40% up to about 75% depending upon particular applications. In certain embodiments, the porosity is within a range of from 40% to 70%, and in particular embodiments, the porosity is within a range of from 40% to 60%. There are several different methods to characterize the porosity of film. The porosity measured in the description herein of the present subject matter is determined by the bulk volume method.

The pores accessible along the print receptive face and/or inside the microporous region are open cell and interconnected to form continuous or substantially continuous channeling for liquid flow, typically via capillary flow. The pore size distribution is in the range of from about 2 microns to about 10 nanometers. In a microporous structure, internal voids, pores, or cells can be characterized as either closed cell or open cell based upon their wall. The term "closed cell" as used herein refers to cells in which the wall of an individual cell is continuous and without openings so that the cell is sealed, and thus there are no channels or apertures between the cells to allow liquid flow therethrough. The term "open cell" refers to cells that are distinguishable from closed cells in that the wall of an individual open cell includes one or more openings which can form interconnected channel(s) or aperture(s) to allow liquid flow therethrough. The term "open cell microporous structure" refers to a microporous structure comprising open cells and interconnected channels. In many embodiments, the open cell microporous structure comprises a majority, i.e., greater than 50%, of open cells and a minority, i.e., less than 50%, of closed cells. In many embodiments, the open cell microporous structure extends from one side of a porous film surface to another side of the porous film surface. The rate or speed of liquid absorption of the open cell microporous structure generally depends on the pore size, amount of the open cells, porosity, and surface tension. In label technology, certain films are referred to as "cavitated films". The main differences between cavitated films and many of the film embodiments of the present subject matter that include open cell microporous structures are (1) that a majority of the cells in cavitated films are not open cells and they are not interconnected, and (2) cavitated films typically exhibit a sealed surface or face, i.e., no pores or openings on the surface or face.

In some embodiments, the ink absorption rate of the microporous film at typical printing conditions is at least 0.01 picoliter/$\mu m^2$/second to thereby provide quick drying of print. In additional embodiments, the ink absorption rate is at least 0.05 picoliter/$\mu m^2$/second, more particularly at least 0.10 picoliter/$\mu m^2$/second, more particularly at least 1.0 picoliter/$\mu m^2$/second, more particularly at least 10 picoliter/$\mu m^2$/second, more particularly at least 100 picoliter/$\mu m^2$/second, more particularly at least 1,000 picoliter/$\mu m^2$/second, more particularly at least 10,000 picoliter/$\mu m^2$/second, and more particularly at least 100,000 picoliter/$\mu m^2$/second. These ink absorption rates are at a printing temperature of 40° C.

In some embodiments, a microporous film is provided having relatively small pores along its face. For example, a film having pores with a maximum opening dimension or span of 1 micron or less can be used to increase surface gloss, promote surface appearance, and/or increase print ink color intensity. Although not wishing to be limited to any particular theory, it is believed that the use of such small pores along a film face reduces the potential of pigment particles being deposited within the pores or otherwise not residing along the film face.

In particular embodiments, the open cell microporous layer which constitutes or includes the absorption layer of the top or face film comprises polymer, air voids, and optional additives and/or agents such as inorganic filler. In many embodiments, the face film comprises at least 30% polyolefins, and in particular embodiments at least 40% polyolefins. In certain embodiments, approximately 50% by weight of polymer in that layer or region is polyolefin or modified polyolefin such as polypropylene, polyethylene, polypropylene copolymer, polyethylene copolymer or the like. Combinations of polymeric materials can be used. One or more particulate agents can be included. A typical size for the particulate agent is in the range of several microns or less. The additives may include one or more of a nucleating agent, an anti-blocking agent, a processing aid, a slip agent, an antistatic agent, a pigment, a cavitating agent, an inorganic filler, a heat stabilizer, an antioxidant, a flame retardant, an acid acceptor, a visible and/or ultraviolet light stabilizer, a surfactant, or a mixture of two or more of any of the foregoing additives. The additives can be present in the above described polymers or films as supplied by a vendor or can be introduced into the film or a film layer as an additive concentrate where the additive is present generally from 1% to 75%, more particularly from 30% to 70%, and in particular embodiments from 40% to 65% by weight, depending on its use. Additives for use in the film or a film layer are further described in U.S. Pat. No. 6,821,592 to Rodick and U.S. Pat. No. 7,217,463 to Henderson. Nonlimiting examples of inorganic fillers include but are not limited to calcium carbonate, silica, alumina oxide, titanium dioxide, etc.

In some embodiments, the open cell microporous structure which constitutes or includes the absorption layer of the top or face film comprises other polymers besides polyolefin. In the event such polymers are not compatible with polyolefin, separated small phase domain(s) in the film may form prior to film stretching. This creates additional small sized pores after film stretching. Nonlimiting examples of other polymers include polystyrene, styrene copolymers, polyurethane, polyester, polyacryl or polymethacryl resin, polycarbonates, ionomers, and combinations thereof.

The open cell microporous structures can be formed by stretching a multiphase separated polymer film or sheet(s) in a machine direction (MD) or both machine and cross directions (CD). A wide range of stretch ratios can be used to form embodiments of the face films of the present subject matter. Typically, a stretch ratio greater than 1:1 can be used, and in particular embodiments, the stretch ratio is greater than 1:4. The upper limit or maximum stretch ratio depends upon the application and film material(s), however, a maximum stretch ratio of about 1:10 is contemplated. Thus, a range of stretch ratios according to this aspect of the present subject matter is from 1:1.1 to 1:10. In many embodiments, a stretch ratio within a range of from 1:2 to 1:8 can be used and more particularly from 1:4 to 1:6. Stretching the film can be performed inline or offline. As noted, stretching can be performed in a single direction or in multiple directions. The stretching ratio required to obtain at least 40% porosity and fast enough absorption speed for solvent inkjet printing varies with the material chemical composition, phase morphology and stretching temperatures. But in many embodiments, the existence of multiple phase domains and the poor adhesion between different phase domains in the film prior to the stretching is essential to creating a microporous structure after stretching. For example, a microporous film can be formed by stretching films containing beta polypropylene crystal phase or films containing $CaCO_3$ and/or one or more other inorganic fillers. An example of polypropylene beta nuclear agent is MPM2000 from Mayzo, Inc. Additional details of forming microporous structures are provided herein. Methods and techniques for stretching films and stretching to particular stretch ratios are known in the art and thus not described herein. For example, descriptions of such aspects are provided in one or more of U.S. Pat. Nos. 6,835,462; 5,709,937; 7,217,463; 7,410,706; 6,376,058; 6,663,947; and 5,585,193.

In certain embodiments, the method to produce a microporous film includes using solvent extraction technology to selectively dissolve one component of the film and remove that component and thereby create a porous structure. The solvent extraction step can be performed before or after film stretching or without film stretching. The solvent used in this embodiment is selected so as to be able to dissolve at least one component in the film and not dissolve other components. After removal of the one or more component(s) in the film, the film is dried and the location of the removed component constitutes the pores.

In certain embodiments, a thin coating may be applied on the face film and particularly upon the print receptive face, to enhance the ink dye or pigment spreading or anchorage and/or other aesthetic properties such as surface gloss. The coating thickness is typically less than 15 microns. In many embodiments, the coating is disposed on one or both of the faces of the film. In certain embodiments, the coating includes a microporous structure and particularly an open cell microporous structure. In certain embodiments, the coating includes one or more surfactants which increase the surface energy of the coating to thereby increase liquid absorption.

The present subject matter also provides laminates which include the noted face film(s). In certain embodiments, the laminates may include additional layers under the top or face film. The layers under the one or more top film(s) are referred to herein as "core layer(s)". The core layer(s) can be either a solid, i.e., nonporous, film or a porous film with the same or different porous structure as the absorption layer of the face film. That is, in particular embodiments, the one or more core layer(s) include a microporous structure that has a porosity within a range of from 40% to 75%, and/or includes a plurality of interconnected pores having a pore size distribution within a range of from 2 microns to 10 nm. The core layer(s) may, in certain embodiments, provide the mechanical or other properties for the laminate. By using soft or stiff polymer(s) in the core layer, a soft or stiff face film can be achieved. For example, a soft print laminate can be made with linear low density polyethylene (LLDPE) in the core layer and a rigid print laminate can be made with polypropylene (PP) in the core layer.

In many applications, a user images the print side of a laminate, such as the laminate 10 of FIG. 1, then removes the liner 40 to expose the pressure sensitive adhesive 30 to a substrate of interest. Pressure sensitive adhesive anchors the imaged film on targeted substrates.

In many embodiments of the present subject matter, the print layer of the pressure sensitive laminate typically includes a polyolefin based open cell microporous liquid absorptive layer on a major print surface. The polyolefin molecule itself does not absorb the polar ink solvent. The capillary flow effect created by the high porosity structure provides the driving force for liquid absorption of both polar and non-polar solvent(s). Since the absorption is from a capillary flow effect, the microporous absorptive layer can absorb the inkjet ink liquid regardless of the chemical type, such as from non-polar solvents to highly polar solvents. The layer or layers underneath the absorptive layer provide mechanical or other properties for the laminate material. Also, by utilizing a high porosity structure, the solvent absorption speed of the absorption layer can be significantly faster than conventional absorptive swellable polymer(s), typically by an order of magnitude, thereby improving printing efficiency.

Additional details and aspects of the present subject matter are as follows.

Adhesives

As noted, in many embodiments, the laminates may utilize one or more layer(s) or region(s) of adhesive. For example, as shown in FIG. 1, the laminate 10 includes a layer 30 of pressure sensitive adhesive.

The adhesive layer may comprise a pressure sensitive adhesive (PSA) which bonds the laminate or at least portions thereof to a surface, typically under applied pressure, at room temperature. The adhesive layer ray be a continuous or discontinuous layer, and it may comprise one or a mixture of two or more adhesives. The adhesive layer may be a patterned adhesive layer with relatively strong adhesive tack level in some areas and a relatively weak adhesive in other areas. In certain embodiments of the present subject matter, the adhesives are printable.

In one embodiment of the present subject matter described herein, the pressure sensitive adhesive comprises an acrylic adhesive material, particularly a crosslinked acrylic resinous material, and more particularly, a crosslinked acrylic emulsion. A particularly useful adhesive material comprises an internally crosslinked acrylic emulsion. These pressure sensitive adhesive materials provide a useful combination of low tack, peel and flow properties with a sufficient level of cohesive strength at a relatively thin coat weight. High molecular weight acrylic adhesives and externally crosslinked acrylic adhesives also may be used.

The adhesive may comprise a rubber based adhesive, acrylic adhesive, vinyl ether adhesive, silicone adhesive, or mixture of two or more thereof. The adhesive may be applied to the laminate as a hot melt, solvent-based or water based adhesive. The adhesive materials that are useful may contain as a major constituent an adhesive polymer such as an acrylic-type polymer; block copolymer; natural, reclaimed, or styrene-butadiene rubber; tackified natural or synthetic rubber; a copolymer of ethylene and vinyl acetate; an ethylene-vinyl-acrylic terpolymer; polyisobutylene; or poly (vinyl ether). Other materials may be included in the adhesive such as tackifying resins, plasticizers, antioxidants, fillers, and waxes.

In certain embodiments, water-based pressure sensitive adhesives can be used. And in particular embodiments, water-based pressure sensitive adhesives are used in combination with water-based flexographic inks.

A description of useful pressure sensitive adhesives may be found in *Encyclopedia of Polymer Science and Engineering. Vol.* 13, Wiley-Interscience Publishers (New York, 1988). Additional description of useful pressure sensitive adhesives may be found in *Encyclopedia of Polymer Science and Technology, Vol.* 1, Interscience Publishers (New York, 1964).

Pressure sensitive adhesives that may be used include the hot melt pressure sensitive adhesives available from H. B. Fuller Company, St. Paul, Minn. Other useful pressure sensitive adhesives include those available from Century Adhesives Corporation, Columbus, Ohio.

Conventional PSAs, including silicone-based PSAs, rubber-based PSAs, and acrylic-based PSAs are useful in certain applications or embodiments. Another commercial example of a hot melt adhesive is, sold by Ato Findley, Inc., of Wauwatusa, Wis. In addition, rubber-based block copolymer PSAs described in U.S. Pat. No. 3,239,478 also can be used.

The adhesive compositions may contain at least one solid tackifier resin component. A solid tackifier is defined herein as one having a softening point above 80° C. When the solid tackifier resin component is present, the adhesive compositions may comprise from about 40% to about 80% by weight of a thermoplastic elastomer component, in one embodiment from about 20% to about 60% by weight, and in another embodiment from about 55% to about 65% by weight of a solid tackifier resin component. The solid tackifier reduces the modulus of the mixture sufficiently to build tack or adhesion. Also, solid tackifiers, particularly the higher molecular weight solid tackifiers (e.g., Mw greater than about 2000) and those having a lower dispersity (Mw/Mn being less than about 3) may be less sensitive to migration into the polymer film layer. This is desirable since migration of tackifier into the film layer may cause dimensional instability.

The solid tackifier resins include hydrocarbon resins, rosin, hydrogenated rosin, rosin esters, polyterpene resins, and other resins which exhibit a proper balance of properties. A variety of useful solid tackifier resins are available commercially such as terpene resins which are sold under the trademark Zonatac by Arizona Chemical Company, petroleum hydrocarbons resins such as the resins sold under the trademark Escorez by Exxon Chemical Company, or Wingtack 95, a synthetic tackifier resin available from Goodyear, Akron, Ohio.

The adhesive layer also may contain one or more pigments to enhance the opacity of the ink layers and permit use of thinner ink layers to achieve desired levels of opacity. Examples of pigments include titanium dioxide and carbon black. The pigment volume concentration may range up to about 10%, in one embodiment from about 5% to about 10%, and in another embodiment from about 2% to about 8%.

The adhesive compositions also may include other materials such as antioxidants, heat and light stabilizers, ultraviolet light absorbers, fillers, colorants, antiblocking agents, reinforcing agents, and processing aids.

The adhesive compositions may contain inorganic fillers and other organic and inorganic additives to provide desired properties. Examples of useful fillers include calcium carbonate, titanium dioxide, metal particles, and fibers.

In certain embodiments, particular coatweights of adhesive are useful. In one embodiment, the amount of adhesive applied to the multilayer laminate is within a range of from about 4 to 20 g/m$^2$(gsm), and particularly from about 6 to 15 g/m$^2$.

In particular embodiments, the adhesive is radiation curable,

Release Liners

As noted, in many embodiments, the laminates may utilize a release liner or layer having release material thereon, in contact with and generally covering the adhesive layer. For example, the laminate 10 depicted in FIG. 1 includes a release liner 40. The release liner may be in the form of a collection of liner segments or components. The release liner is typically paper, filmic materials, or combinations thereof.

A wide variety of release materials such as those typically used for pressure sensitive tapes and labels are known, including silicones, alkyds, stearyl derivatives of vinyl polymers (such as polyvinyl stearyl carbamate), stearate chromic chloride, stearamides and the like. Fluorocarbon polymer coated release liners are also known but are relatively expensive. For most pressure sensitive adhesive applications, silicones are by far the most frequently used materials.

Silicone release coatings have easy release at both high and low peel rates, making them suitable for a variety of production methods and applications. In certain embodiments, the release layer includes one or more silicone materials.

Known silicone release coating systems generally include a reactive, silicone polymer, e.g., an organopolysiloxane (often referred to as a "polysiloxane," or simply, "siloxane"); a crosslinker; and a catalyst. After being applied to the adjacent layer or other substrate, the coating generally must be cured to crosslink the silicone polymer chains, either thermally or radiatively (by, e.g., ultraviolet or electron beam irradiation).

Based on the manner in which they are applied, three basic types of silicone release coatings used in the pressure sensitive adhesive industry are known: solvent borne, water borne emulsions, and solvent free coatings. Each type has advantages and disadvantages. Solvent borne silicone release coatings have been used extensively but, because they employ a hydrocarbon solvent, their use in recent years has tapered off due to increasingly strict air pollution regulations, high energy requirements, and high cost. Indeed, the energy requirements of solvent recovery or incineration generally exceed that of the coating operation itself.

Water borne silicone emulsion release systems are as well known as solvent systems, and have been used on a variety of pressure sensitive, products, including tapes, floor tiles, and vinyl wall coverings. Theft use has been limited, however, by problems associated with applying them to paper substrates. Water swells paper fibers, destroying the dimensional stability of the release liner backing and causing sheet curling and subsequent processing difficulties.

Solventless or solvent-free silicone release coatings have grown in recent years and now represent a major segment of the silicone release coating market. Like other silicone coatings, they must be cured after being applied to the flexible liner substrate. Curing produces a crosslinked film that resists penetration by the pressure sensitive adhesive.

Informative descriptions of various release materials, their characteristics, and incorporation in laminate assemblies are provided in U.S. Pat. Nos. 5,728,469; 6,486,267; and US Published Patent Application 2005/0074549, owned by the assignee of the present application. It is also contemplated that various waxes known in the art could be used for the release material or utilized in the release layer.

In certain embodiments of the present subject matter, the multilayer laminates utilize release layers that are relatively thin. For example, a typical release layer thickness is from about 1 to about 4 microns. In particular embodiments, the thickness of the release layer is from about 1 to about 2 microns.

Materials suitable for use as a release coating may include acrylics, silicones, polyurethanes, and the like. For certain embodiments, a commercially available, PET23 release liner from Mitsubishi can be used. The noted PET23 release liner is a film of polyethylene terephthalate (PET) coated with a siliconized release agent. In certain embodiments, a silicone coated paper support layer available from Avery Graphics under the designation Sample 546 Silver can be used. That material is a white mando backing coated with 9630 silicones at a coat weight of 1.15 g/m$^2$. Particular and additional examples of materials for use in the release coating may also include HYCAR 26706 acrylic emulsion available from Lubrizol Corporation, Wickliffe, Ohio, and the silicone emulsion system 3200 from Dow Corning Corporation, Midland, Mich. (base silicone 5M3200, CRA agent 5M3030 and catalyst emulsion SM 3010). It may be desirable to crosslink the polymer in the release coating to achieve an elevated softening point. Certain crosslinkers that can bind reactively with the carboxylic group of acrylic and urethane emulsions may be used. An example of an effective crosslinker is XAMA 7, a polyaziridine oligomer from Ichemco; Srl (Cuggiono, Italy). Other crosslinkers that may be used include water-dispersible polyisocyanates; such as BAYHYDUR 302 and 303 from Bayer Corp., and titanium and zirconium crosslinkers from E.I. du Pont de Nemours and Company (Wilmington, Del.), such as TYZOR TE and LA (Ti-derived water-stable) and TYZOR ZEC (Zr-derived).

The release coating may further include additives, such as release modifiers, rheology agents, surfactants, leveling agents, and defoamers. Examples of such additives may include release modifiers, such as MICHEM 43040 (polypropylene wax emulsion) from Michelman, Inc, (Cincinnati, Ohio), and Fluids 190 and 193 from Dow Corning Corporation (Midland, Michigan); low foam surfactants, such as TRITON CF-10 from The Dow Chemical Company (Midland, Mich.) and ZONYL FSO from E.I. du Pont de Nemours and Company (Wilmington, Del.); rehology modifiers, such as CELLOSIZE ER15 from The Dow Chemical Company; defoamers; such as BYK 19 and 24 from Byk-Chemie GmbH (Wesel, Germany): dispersing agents for inorganic fillers, such as SOLSPERSE 40000 from Lubrizol Corporation (Wickliffe, Ohio) and DISPERBYK 191, 192 from Byk-Chernie GmbH (Wesel, Germany). It is also contemplated that additional polymers such as an SBR latex could be included in the release formulation to increase the release force, i.e., the adhesive force.

Other additives that may be included in the release coating comprise inorganic fillers, such as talc, calcium carbonate, clay, silica, etc. The presence of such inorganic fillers may give a matte-look to the final multilayer laminate; as well as improve the break-edge selectivity of the transferred image. Examples of such inorganic fillers may include NYTAL 7700 talc pigment (The Cary Company, Addison, Ill.), VAI TALC PC and 4000 talc powders (R.T. Vanderbilt Company, Inc., Norwalk, Conn.), and ULTRAWHITE 90 clay (Engelhard Corporation; Iselin, N.J.). The particle size for the filler may be in the range of about 0.5 to 30 microns, particularly about 1 to 20 microns, more particularly about 2 to 10 microns.

The present subject matter can be used for graphic decoration, signage, banners, wall paper, car wrapping materials, and label applications which require imaging the material with absorption based inkjet printers, especially high boiling point solvent or water based inkjet printers and adhering the printed film on substrates with PSA.

EXAMPLES

Various samples of printable laminates in accordance with the present subject matter were prepared and evaluated. The results of the evaluations are as follows.

Print Test Method

Samples were evaluated for printability using both a wide format high boiling point polar solvent type inkjet printer and a desktop water based inkjet printer.

In evaluating media printability with the polar solvent based inkjet printer, printing was conducted on a face film with a wide format Eco-Solvent inkjet printer Roland Soljet Pro II XC-540 printer (available from Roland Company) equipped with Eco-Sol Max inkjet inks. An image file with graphics and color bleeding pattern was printed on the face film with AVERY MPI1005SC ICC profile to check the image quality and resolution. The temperature control of the printer was set as: preheat 40° C./printer heat 40° C./drier heat 50° C. Dryness of the print was evaluated by applying a piece of copy paper over the top of the print with a pressure roller when print was immediately exiting the heating bed of the printer. The copy paper was removed to assess whether there was wet ink transferred to the paper. No noticeable ink transfer was considered "dry to touch." An image file with a set of solid color blocks with 25%, 50%, 75%, 100% ink load of cyan, magenta, yellow and black ink respectively, were printed on films with the ICC profile turned off to determine the ink density of the media. The ink density was measured by an X-Rite eXact™ spectrophotometer.

In evaluating media printability with the water based inkjet printer, various film samples were selected to print with an Epson WF-3520 desktop water based inkjet printer. Dryness of the print was evaluated by applying a piece of copy paper over the top of the print with a pressure roller as the print sheet ejected out from the printer. The copy paper was removed to see whether wet ink transferred to the paper. No noticeable ink transfer was considered "dry to touch." The printer was not equipped with any media drying heater(s).

Ink Absorption Properties Evaluation

The ink absorption properties of the samples were evaluated by two methods: (i) IGT ink penetration test by using an IGT Printability tester type A1 and (ii) ink absorption and spreading test by use of an automatic microscopic contact angle meter MCA-3 from KYOWA Interface Science Co. Ltd. In the IGT ink penetration test, a drop of ink was passed through a nip utilizing a known, controlled pressure. One side of the nip held a sample of the material being tested. As the ink droplet passed through the pressurized nip, the ink spread out, creating a stain on the test material. The length of the stain was measured to determine the material's holdout properties. In the ink absorption and spreading test, a picoliter drop of Eco-Sol max black ink was ejected from an inkjet nozzle on a sample surface. A high speed optical microscope camera captured unabsorbed ink drop absorption and spreading images as functions of time. Then ink drop contact angle, diameter, as well as volume left on the sample surface as functions of time were calculated by imaging processing software.

Face Film Preparation Process

Certain face film samples listed in the examples were prepared by using a multilayer conventional co-extrusion film cast line equipped with four extruders A, B, C, D and up to a 7 layer feed block and a set of inline machine direction orientation (MDO) stretching units manufactured by LabTech Engineering company Ltd. Each extruder supplied a melt formulation to a symmetric feedblock (feed block structure ABCDCBA) where the melts were combined to form a single molten stream consisting of a multilayer formulation. The molten stream was cast onto a cast roll, solidified, and moved to an in-line MDO section. In the MDO section, the film sheet was reheated and stretched at a certain draw down ratio and then annealed in the annealing rolls, then cooled and wound into a film roll in the end. The resin formulation in extruder A, B, C, D could be the same or different based on the film layer structure. For example, a single layer film was made by feeding all extruders A, B, C, D, the same resin formulation and a two layer film was made by feeding extruder A the same resin formulation as B and feeding extruder C the same resin as D. A valve in the feedblock for each layer was provided which could be turned off so a non-symmetric film structure could be made. The layer thickness ratio of the multilayer film was controlled via the ratios of each extruder. Biaxial stretched samples were prepared as follows. A thick cast sheet was formed using an extrusion line without going through the MDO stretching unit. Then, the cast sheet was stretched using biaxial orientation in a Karo IV Laboratory Stretcher offline (manufactured by Bruckner Maschinenbau GmbH, Siegsdorf, Germany). The extrusion, MDO and biaxial temperature conditions were adjusted based on material formulation to provide uniform samples. All the film samples had a thickness of at least 25 microns thick, if not otherwise specified.

Example A

A single layer porous polyethylene (PE) film with different stretch ratios was prepared as follows. Mix 75% $CaCO_3$/LDPE master batch resin pellet (Colortech 40002-08, master batch with 75% $CaCO_3$ and 25% LDPE, density=1.82) and 25% LLDPE resin pellet (Dowlex 2056G; MI=1.0; density=0.92). Total proportions in the blend resin were 56% $CaCO_3$ and 44% PE. Feed resin pellet blend in extruder A, B, C and D. The extruder temperature was set as 420° F. Cast roll and MDO rolls temperatures was set as two cast roll T=120° F.; pre-heat 1, 2, 3, 4, 5 rolls T=195° F.; stretching 1, 2 rolls T=185° F.; annealing 1 and 2 rolls T=195° F.; and cooling roll T=70° F. To produce film samples with different stretching ratios, the draw ratio between stretching roll 1 and stretching roll 2 was set at 1:1, 1:2, 1:3, 1:3, 1:3.5, 1:4.5, 1:5 respectively for each sample. Corresponding samples collected were labeled as samples A-1X, A-2X, A-3X, A-3.5x, A-4.5X, and A-5X. The printing results of samples are listed below. The porosity of the samples was calculated based on density.

Table 1 lists the Eco-Sol inkjet printer printing result of example A samples. Compare-1, and -2 samples are two commercial wide format inkjet printable non-microporous film products manufactured by AVERY DENNISON. Compare-3 sample is a solid PE film. Due to the non-polarity of PE and high polarity of the ink solvent, solid PE film has very low ink absorption. As a result, print was very wet and ink drops on the print surface flew into each other and led to very poor image resolution. Sample A-1X included 56% slightly porous $CaCO_3$ filler within the PE, but no machine direction stretching. This sample printed slightly better than the Compare-3 sample due to the $CaCO_3$ filler. However, this sample exhibited very wet properties and poor image quality. From sample A-1X to A-5X, as the stretching ratio increased, more interconnected pores were created. When a ratio of 3 times stretching was reached, the porosity created provided enough absorption capability for print, so the print reached a "dry to touch" characteristic.

TABLE 1

Eco-Sol Inkjet Printer Printing Result of Example A and Reference Samples

| Sample ID | Sample Description | Print Dryness | Print Quality |
| --- | --- | --- | --- |
| Compare-1 | AVERY MPI ™ 1005 cast vinyl film | Dry, no ink transfer | Good resolution |
| Compare-2 | AVERY TMP ™ 7000 non-vinyl film with polyurethane print skin | Dry, no ink transfer | Good resolution |
| Compare-3 | 50 micron single layers LDPE film made from 100% Dowlex 2056G. no stretching in MD | Very wet, over 80% ink transferred to paper | Nearly no resolution. |

TABLE 1-continued

Eco-Sol Inkjet Printer Printing Result of Example A and Reference Samples

| Sample ID | Sample Description | Print Dryness | Print Quality |
| --- | --- | --- | --- |
| A-1X | stretching ratio 1:1 | Very wet, approximately 50% ink transferred to paper | Nearly no resolution. |
| A-2X | stretching ratio 1:2 | Slightly wet at dark color, approximately 30% ink transferred to paper | Poor resolution. Better than A-1 |
| A-3X | stretching ratio 1:3 | Dry to touch | Good image resolution, ink color density is slightly lower compared with Compare-1 |
| A-3.5X | stretching ratio 1:3.5 | Dry to touch | Similar to A-3X |
| A-4.5X | stretching ratio 1:4.5 | Dry to touch | Similar to A-3X |
| A-5X | stretching ratio 1:5 | Dry to touch | Similar to A-3X |

Example B

A single layer porous polypropylene (PP) film with different stretch ratios was prepared as follows: Mix 80% $CaCO_3$/PP master batch resin pellet (Ampacet 103211 $CaCO_3$, Ampacet $CaCO_3$/PP master batch with 70% $CaCO_3$, density=1.70) and 20% PP resin pallet (Flint Hill HPP, P4G3Z-050F; MFR=4.2, density=0.9). Total proportions in the blend resin were 56% $CaCO_3$ and 44% PP. Feed resin pellet blend in extruder A, B, C and D. The extruder temperature was set as 460° F. Cast roll and MDO rolls temperatures were set as two cast roll T=120° F.; pre-heat 1, 2, 3, 4, 5 rolls T=230° F.; stretching 1, 2 rolls T=230° F.; annealing 1 and 2 rolls T=230° F.; and cooling roll T=70° F. To make film samples with different stretching ratios, the draw ratio between stretching roll 1 and stretching roll 2 was set at 1:1, 1:2, 1:3, 1:4, 1:4.8, 1:5 respectively for each sample. The banding disappeared after stretching 4.8X and above. Corresponding samples collected were labeled as samples B-1X, B-2X, B-3X, B-3.5x, B-4.8X and A-5X. When the samples were stretched at ratios lower than 1:4, non-uniform banding along CD direction was observed. The printing results of various samples are listed below.

Table 2 lists the Eco-Sol inkjet printer printing result of example B samples. Compare-4 sample is a mono layer PP film, which has no porous structure and no absorption capacity so it exhibited very wet characteristics. Compare-5 sample is a cavitated biaxial oriented PP film available from COSMO. Most pores inside this sample were isolated (not interconnected) and thus could not form continuous channels for ink fluid to flow within the interior of the film. Therefore, this sample was wet after print. From sample B-1X to A-5X, as the stretching ratio increased, more interconnected pores were created. When a ratio of 4.8 times stretching was reached, the porosity created provided enough absorption capability for print, so the print reached a "dry to touch" characteristic.

TABLE 2

Eco-Sol Inkjet Printer Printing Result of Example B and Reference Samples

| Sample ID | Sample Description | Print Dryness | Print Quality |
|---|---|---|---|
| Compare-4 | 50 micron single layers HPP film made from 100% Flint hill HPP, P4G3Z-050F no stretching in MD | Very wet, over 80% ink transferred to paper | Nearly no resolution. |
| Compare-5 | Cavitated BOPP film from Cosmo (60PCT-2 grade) | Very wet, over 80% ink transferred to paper | Nearly no resolution. |
| B-1X | stretching ratio 1:1 | Very wet, approximately 50% ink transferred to paper | Nearly no resolution. |
| B-4.8X | stretching ratio 1:4.8 | Dry to touch | Similar to A-3X |
| B-5X | stretching ratio 1:5 | Dry to touch | Similar to A-3X |

Example C

A single layer porous polyethylene and ethylene vinyl acetate (PE/EVA) blend film with different stretch ratios was prepared as follows. Mix 68% $CaCO_3$/EVA master batch resin pellet (Master batch is compounded by Heritage plastics, 75% $CaCO_3$ in EVA with 26% binyl acetate, density=1.81, MI=0.32) and 32% HDPE resin pallet (DMDA 8904 NT7 from Dow; MI=4.4 density=0.952). Total proportions in the blend resin were 50% $CaCO_3$ and 32% HDPE and 18% EVA with 26% VA. Feed resin pellet blend in extruder A, B, C and D. The extruder temperature was set as 460° F. Cast roll and MDO rolls temperatures were set as two cast roll T=120° F.; pre-heat 1, 2, 3, 4, 5 rolls T=170° F.; stretching 1, 2 rolls T=170° F.; annealing 1 and 2 rolls T=180° F.; and cooling roll T=70° F. To make film samples with different stretching ratios, the draw ratio between stretching roll 1 and stretching roll 2 was set at 1:1, 1:2, 1:3, 1:4, 1:5, 1:6 respectively for each sample. Corresponding samples collected were labeled as samples B-1X, B-2X, B-3X, B-3.5x, B-4.8X and A-5X. When the samples were stretched at ratios lower than 1:4, non-uniform banding along CD direction was observed. The banding disappeared after stretching 5X and above. The printing results of samples are listed below in Table 3.

Similar to example B, when the stretching ratio reached 5 times in the machine direction, the samples began to exhibit a "dry to touch" characteristic and exhibit good resolution after print.

TABLE 3

Eco-Sol Inkjet Printer Printing Result of Example C Samples

| Sample ID | Sample Description | Print Dryness | Print Quality |
|---|---|---|---|
| C-1X | stretching ratio 1:1 | Very wet, approximately 50% ink transferred to paper | Nearly no resolution. |
| C-5X | stretching ratio 1:5 | Dry to touch | Good resolution, color density is slightly higher than to A-3X, but lighter than Compare-1 |
| C-6X | stretching ratio 1:6 | Dry to touch | Same as B-5X |

Example D

A two layer film with a first layer having a microporous structure like example C and second layer having no voids was prepared as follows: Feed same resin blend as in example C in extruder A and B and feed 100% HDPE resin (DMDA 8904 NT7 from Dow). The extruder temperature was set as 460° F. Cast roll and MDO rolls temperatures were set as two cast roll T=120° F.; pre-heat 1, 2, 3, 4, 5 rolls T=170° F.; stretching 1, 2 rolls T=170° F.; annealing 1 and 2 rolls T=180° F.; and cooling roll T=70° F. To make film samples with different stretching ratios, the draw ratio between stretching roll 1 and stretching roll 2 was set at 1:5. The rpm ratio between the extruder A, B and C, D was varied to make film samples with different top layer thicknesses. The top layer thickness was controlled to be 5 microns, 15 microns, 25 microns, and 40 microns. The total film thickness was 2.5 mil. Table 4 lists the Eco-Sol inkjet printer printing result of example D. Table 4 indicates that the porous film thickness has to be approximately 25 microns to reach "dry to touch" with the Roland Eco-Sol inkjet printer. The minimum thickness may vary slightly based on the printer design from different manufacturers and heat settings during printing.

TABLE 4

Eco-Sol Inkjet Printer Printing Result of Example D

| Sample ID | Print Layer Thickness | Print Dryness |
|---|---|---|
| D-1 | Approximately 5 | Very wet |
| D-2 | Approximately 15 | wet |
| D-3 | Approximately 25 | Dry to touch |
| D-4 | Approximately 40 | Dry to touch |

Example E-PE

A non-stretched cast film was made using the same process as described for Example A. Then the sample was offline stretched by using Karo IV Laboratory Stretcher at a stretch ratio of 3 (CD)X3 (MD). The stretch oven was set at 230° F. with a 60 second heat time, 25% second stretch rate in both CD and MD directions, 5 second annealing in an annealing oven and 0.98 annealing ratio used in both MD and CD.

Example E-PP

A non-stretched cast film was made using the same process as described for Example B. Then the sample was offline stretched in MD and CD directions simultaneously using a Karo IV Laboratory Stretcher at a stretch ratio of 3 (CD)X3(MD). The stretch oven was set at 284° F. with 60 second heat time, 25% second stretch rate in both CD and MD directions, 5 second annealing in an annealing oven and 0.98 annealing ratio in both MD and CD.

Example F

A microporous film (a single microporous PP film was prepared by biaxial stretching of a beta spherulite polypropylene film. Polypropylene film with open cell microporous structure was used. The pore size was approximately 50 nm with 41% porosity. The film was formed by biaxial stretching of the beta-nucleated polyprolylene film. Film thickness was 25 microns.

Example G

A microporous film (single microporous PP/PE film) was made by biaxial stretching of a beta spherulite PP/PE film. The pore size was in the range of approximately 10 microns to 1 micron.

Example H

This sample was prepared by the laminate process described in association with example G. This sample included a film on top of a solid BOPP film with an emulsion based pressure sensitive adhesive.

TABLE 5

Eco-Sol Inkjet Printer Printing Result of Examples E, F, G

| Sample ID | Sample Description | Print Dryness | Print Quality |
|---|---|---|---|
| Example E-PE-3 × 3 | 3 × 3 stretching in CD × MD | Dry to touch | OK quality, but less color saturation than example F with same printing condition |
| Example E-PP-3 × 3 | 3 × 3 stretching in CD × MD | Dry to touch | Similar to example E-PE-3 × 3 |
| Example F | A microporous film | Dry to touch | Good print quality |
| Example G | A microporous film | Dry to touch | Similar to example E-PE-3 × 3 |
| Example H | A microporous film/solid BOPP laminate | Dry to touch | Print same as example G |

Ink Color Density

Table 6 lists the ink color density of four basic color inks (cyan, magenta, yellow, black) at different loadings. Ink color density of the microporous samples were slightly higher than Compare-1 sample since the film surface is much rougher than high gloss MPI1005SC, giving the same ink loading. There are several different approaches for increasing the ink color density on print: (1) slightly increasing the amount of color ink during the printing; (2) smoothing the film surface roughness by using a gloss embossing or calendar extrusion roll; (3) reducing the surface pore size via optimizing the extrusion conditions; and (4) adding a thin layer of high gloss porous coating on the surface of the film.

TABLE 6

Basic Color (Cyan, Magenta, Yellow, Black) Block Print Ink Color Density with Roland Eco-Sol Printer

| Example | Ink Loading | Four Basic Color Block Print Ink Color Density | | | |
|---|---|---|---|---|---|
| | | C | M | Y | K |
| Compare-1 | 25% | 0.53 | 0.28 | 0.40 | 0.53 |
| | 50% | 1.03 | 0.57 | 0.68 | 1.15 |
| | 75% | 1.71 | 1.04 | 0.85 | 1.79 |
| | 100% | 2.51 | 1.89 | 0.98 | 2.39 |
| A-2X | 25% | 0.35 | 0.24 | 0.33 | 0.41 |
| | 50% | 0.58 | 0.41 | 0.51 | 0.66 |
| | 75% | 0.84 | 0.78 | 0.67 | 0.93 |
| | 100% | 1.09 | 1.20 | 0.75 | 1.12 |
| A-3X | 25% | 0.36 | 0.21 | 0.33 | 0.46 |
| | 50% | 0.62 | 0.42 | 0.52 | 0.80 |
| | 75% | 0.85 | 0.67 | 0.64 | 0.97 |
| | 100% | 1.02 | 1.12 | 0.74 | 1.13 |
| A-3.5X | 25% | 0.37 | 0.22 | 0.34 | 0.45 |
| | 50% | 0.64 | 0.44 | 0.53 | 0.78 |
| | 75% | 0.88 | 0.68 | 0.66 | 0.92 |
| | 100% | 1.02 | 1.11 | 0.75 | 1.04 |
| A-4.5X | 25% | 0.38 | 0.22 | 0.32 | 0.43 |
| | 50% | 0.65 | 0.45 | 0.50 | 0.75 |
| | 75% | 0.88 | 0.69 | 0.61 | 0.91 |
| | 100% | 1.01 | 1.01 | 0.69 | 1.07 |
| B-4.8X | 25% | 0.27 | 0.16 | 0.25 | 0.35 |
| | 50% | 0.51 | 0.37 | 0.45 | 0.66 |
| | 75% | 0.82 | 0.73 | 0.61 | 0.89 |
| | 100% | 1.27 | 1.43 | 0.77 | 1.23 |
| C-5X | 25% | 0.41 | 0.24 | 0.30 | 0.46 |
| | 50% | 0.69 | 0.53 | 0.50 | 0.76 |
| | 75% | 0.88 | 0.77 | 0.61 | 0.81 |
| | 100% | 0.94 | 1.03 | 0.65 | 0.87 |
| G | 25% | 0.34 | 0.18 | 0.24 | 0.33 |
| | 50% | 0.72 | 0.43 | 0.49 | 0.66 |
| | 75% | 1.07 | 0.81 | 0.62 | 1.08 |
| | 100% | 1.92 | 1.70 | 0.76 | 1.70 |
| G | 25% | 0.26 | 0.16 | 0.25 | 0.31 |
| | 50% | 0.48 | 0.35 | 0.43 | 0.60 |
| | 75% | 0.79 | 0.69 | 0.57 | 0.84 |
| | 100% | 1.18 | 1.23 | 0.69 | 1.06 |

Ink Absorption Result

The ink absorption properties of the samples were evaluated by two methods: (i) IGT ink penetration test by using IGT Printability tester type A1, and (ii) Nano contact angle and ink spreading test with Eco-Sol max black ink. In the IGT ink penetration test, a drop of ink was passed through a nip utilizing a known, controlled pressure. One side of the nip holds a sample of the material being tested. As the ink droplet passes through the pressurized nip, it spreads out, creating a stain on the test material. The length of the stain was measured to determine the material's holdout properties. In the ink spreading test, a picoliter drop of ink was ejected from an inkjet nozzle on the sample surface. A high speed optical microscope camera captured unabsorbed ink drop volume left on the sample surface as a function of time.

Figure 4:
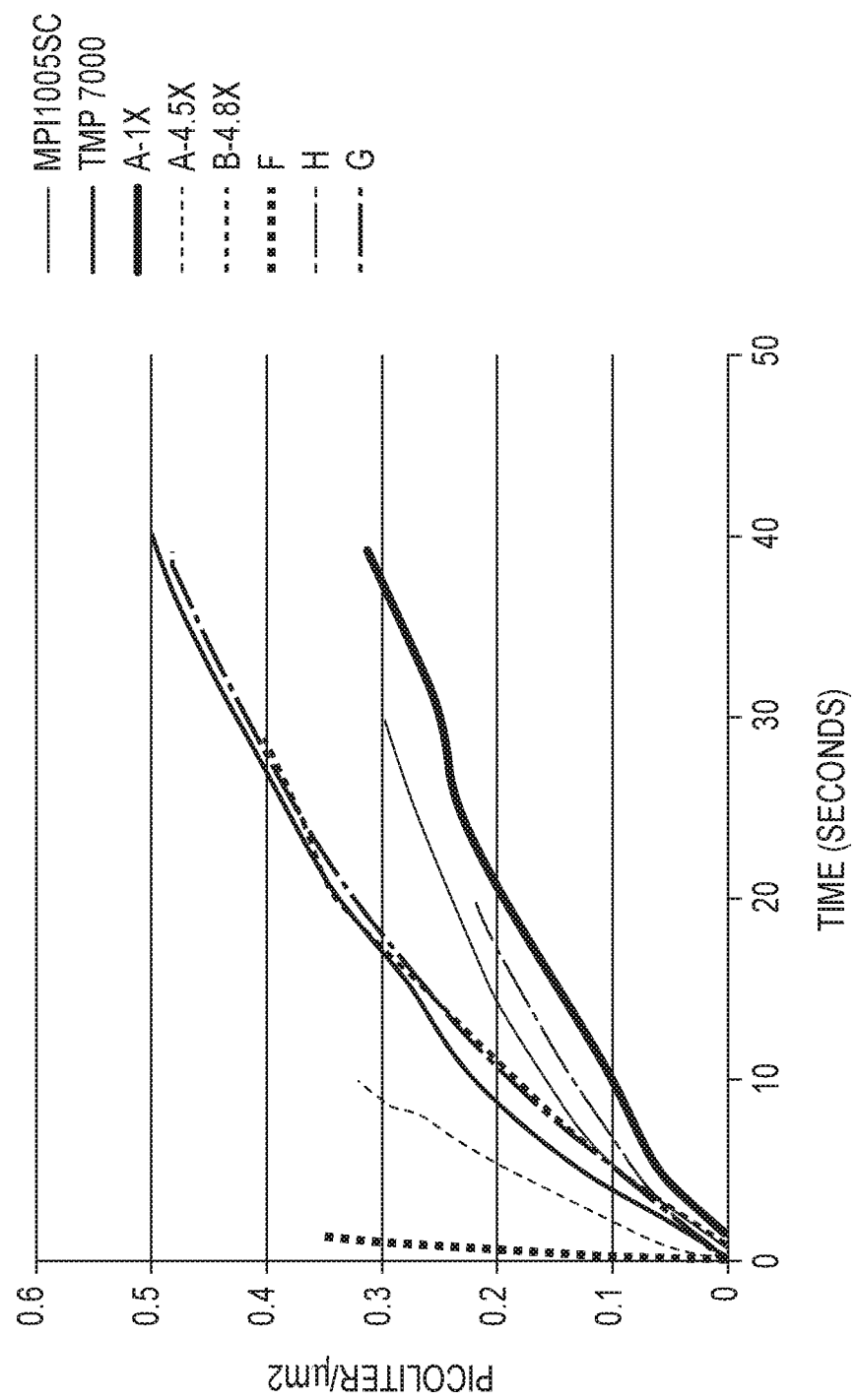
FIG. 4 is a graph showing extent and rate of ink absorption as a function of time of several print media samples in accordance with the present subject matter compared to conventional print media.

FIG. 4 illustrates the Eco-Sol max black ink absorption of microporous samples and non-porous samples. Samples A-4.5X, B-4.8X, F and G had much higher absorption speed than Compare-1 sample (MPI1000SC). This enables the noted samples to be printed at higher speed. This in turn increases printing efficiency. FIG. 4 also shows ink absorption speed of examples tested by the Nano contact angle instrument.

Table 7 lists the IGT ink penetration length of the samples and porosity of film based on density calculation. Samples with IGT ink penetration length equal or greater than 16 cm and porosity less than 40% were still wet after print.

TABLE 7

IGT Ink Prenetration Length of Different Samples

| Sample ID | IGT Ink penetration Length (cm) | Porosity |
|---|---|---|
| A-1X | 18.20 | Approximately 10% |
| A-3.5X | 10.70 | Approximately 40% |
| A-4.5X | 10.10 | Approximately 40% |
| B-4.8X | 12.03 | Approximately 44% |
| C-5X | | Approximately 40% |
| F | 10.6 | Approximately 55% |
| G | 14.8 | Approximately 40% |
| H | 16.6 | Approximately 30% |

Table 8 lists the water based inkjet printing results of selected samples printed with an Epson WF-3520 desktop water based inkjet printer. The results demonstrate that the open cell microporous samples have enough water absorption management capability to reach "dry to touch" after print. Application of a very thin layer even less than 1 micron thick, of a porous inkjet printable top coating on top of this type of microporous film may further improve the ink anchorage and enhance surface smoothness based on application need.

TABLE 8

Water Based Inkjet Printing Results of Selected Samples

| Sample ID | Print Dryness | Print Quality |
|---|---|---|
| C-1X | Very wet | Significant bleeding |
| C-5X | Dry to touch | Ok image resolution, slightly reduced color density |
| C-6X | Dry to touch | OK image resolution, slightly reduced color density |
| F | Dry to touch | Good image resolution |
| G | Slightly wet at high black ink loading color | See some bleeding with high loading black ink. |

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A method of forming a polymer film adapted for absorbing liquid inks from inkjet printing, the film defines a first face for receiving print and a second oppositely directed face, the film including a microporous structure extending along at least one face of the film, the method comprising:
    extruding polymer to form a film;
    stretching the film to a stretch ratio within a range of from 1:1.1 to 1:10 such that the microporous structure has a porosity within a range of from 40% to 75% and includes a plurality of interconnected pores having a pore size distribution within a range of from 2 microns to 10 nm,
    wherein the film exhibits an ink absorption rate of at least 0.01 picoliter/$\mu m^2$/second at a printing temperature of 40° C.

2. The method of claim 1 wherein stretching the film is performed inline.

3. The method of claim 1 wherein stretching the film is performed off line.

4. The method of claim 1 wherein stretching the film is performed in a single direction.

5. The method of claim 1 wherein stretching the film is performed in both a machine direction and a cross direction.

6. The method of claim 1 wherein stretching is performed such that the stretch ratio is within a range of from 1:2 to 1:8.

7. The method of claim 1 wherein the film after stretching includes the microporous structure having a thickness of at least 20 microns.

8. The method of claim 1 wherein the film includes at least one polyolefin.

9. The method of claim 8 wherein the film includes at least 30% polyolefins.

10. The method of claim 9 wherein the film includes at least 40% polyolefins.

11. The method of claim 10 wherein the film includes at least 50% polyolefins.

12. The method of claim 8 wherein the polyolefin is selected from the group consisting of polyethylene, polypropylene, polyethylene copolymer, polypropylene copolymer, and combinations thereof.

13. The method of claim 1 wherein the porosity is within a range from 40% to 70%.

14. The method of claim 13 wherein the porosity is within a range of from 40% to 60%.

15. The method of claim 1 wherein the film includes at least one inorganic filler.

16. The method of claim 15 wherein the at least one inorganic filler is present within a range of from 30% to 70% by weight.

17. The method of claim 1 wherein the film comprises at least one polyolefin and at least one polymer incompatible with the at least one polyolefin, the at least one polymer selected from the group consisting of polystyrene, styrene copolymer, polyurethane, polyester, polyacryl resin, polymethacryl resin, polycarbonate, ionomers, and combinations thereof.

18. The method of claim 1 wherein the film comprises a beta polypropylene crystal phase.

19. The method of claim 1 wherein the film is stretched in only a machine direction (MD).

20. The method of claim 1 further includes the step of applying a top coat on the first face, wherein the top coat includes a microporous structure to thereby improve ink anchorage and/or surface smoothness.

21. A method of forming a polymer film adapted for absorbing liquid inks from inkjet printing, the film defines a first face for receiving print and a second oppositely directed face, the film including a microporous structure extending along at least one face of the film, the method comprising:
    extruding polymer to form a film;
    stretching the film to a stretch ratio within a range of from 1:1.1 to 1:10 such that the microporous structure has a porosity within a range of from 40% to 75% and includes a plurality of interconnected pores having a pore size distribution within a range of from 2 microns to 10 nm,
    wherein the film comprises of at least one beta polypropylene crystal phase and at least one inorganic filler.

* * * * *